(No Model.)
2 Sheets—Sheet 1.
V. T. PAYNE.
FEEDER ATTACHMENT FOR THRASHING MACHINES.
No. 533,016.
Patented Jan. 22, 1895.
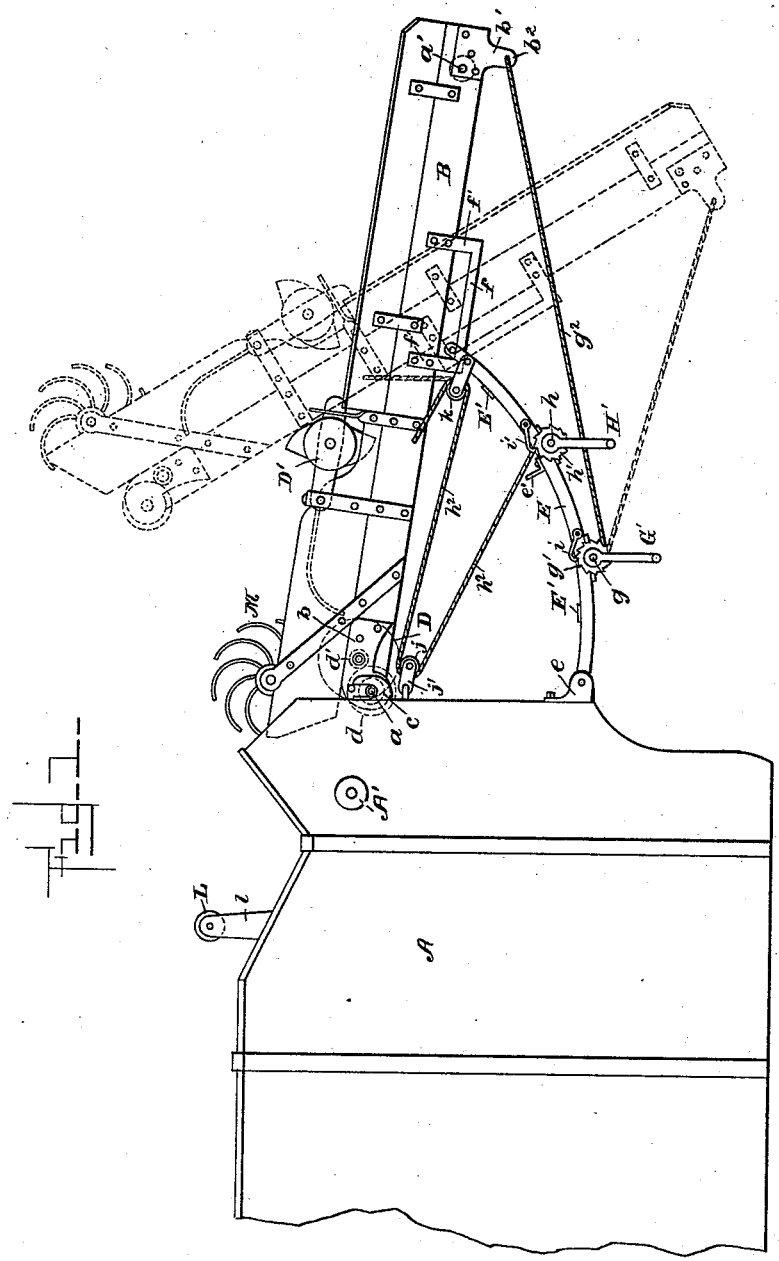
Witnesses
R. W. Bell
T. A. Lay Jr.
Inventor
Victor Tom Payne,
By A. M. Smith & Son
Attorneys.

(No Model.)  
2 Sheets—Sheet 2.
V. T. PAYNE.
FEEDER ATTACHMENT FOR THRASHING MACHINES.
No. 533,016.  
Patented Jan. 22, 1895.
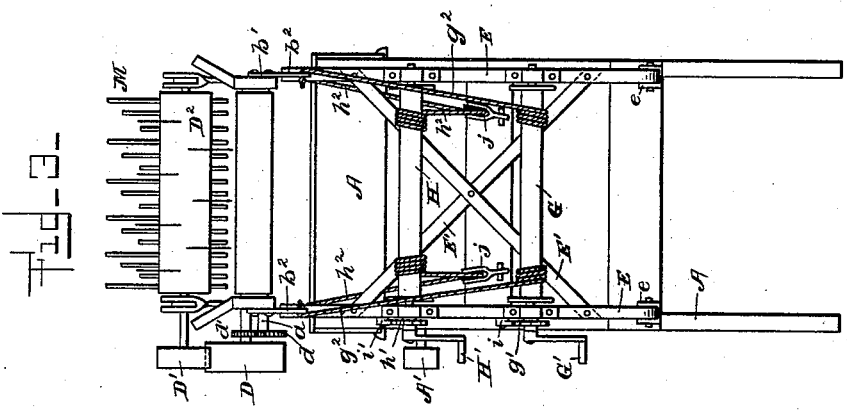
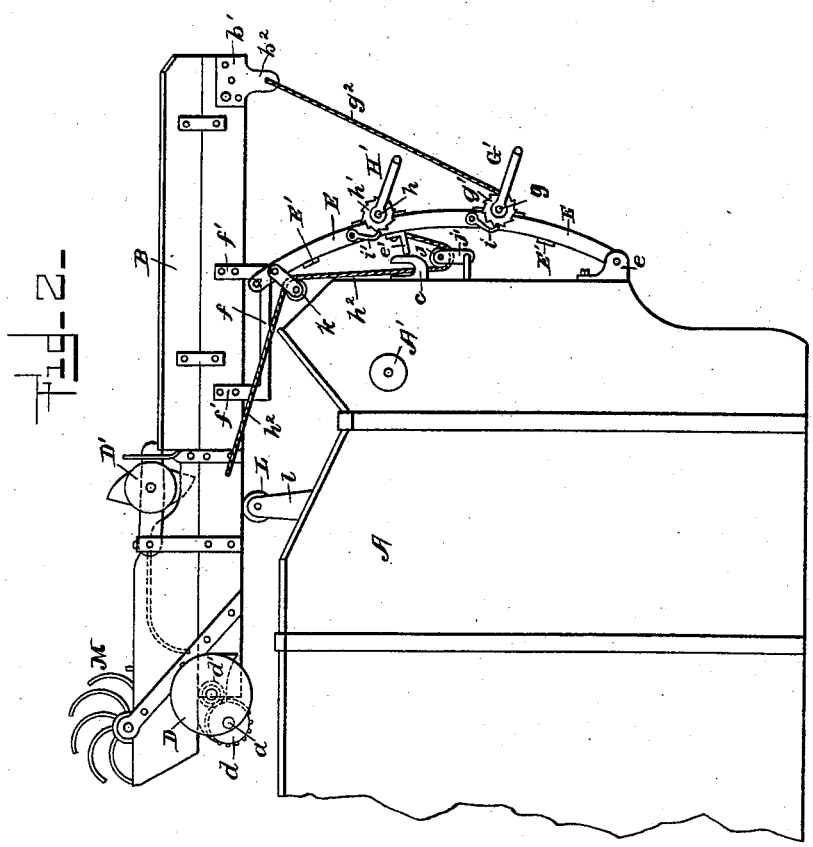
Witnesses  
Inventor  
Victor Tom Payne.  
By A. M. Smith & Son,  
Attorneys.

UNITED STATES PATENT OFFICE.

VICTOR TOM PAYNE, OF BATTLE CREEK, MICHIGAN, ASSIGNOR TO THE NICHOLS & SHEPARD COMPANY, OF SAME PLACE.

FEEDER ATTACHMENT FOR THRASHING-MACHINES.

SPECIFICATION forming part of Letters Patent No. 533,016, dated January 22, 1895.

Application filed December 21, 1893. Serial No. 494,245. (No model.)

*To all whom it may concern:*

Be it known that I, VICTOR TOM PAYNE, a citizen of the United States, and a resident of Battle Creek, county of Calhoun, and State of Michigan, have invented a new and useful Improvement in Feeder Attachments for Thrashing-Machines, &c., of which the following is a full, clear, and exact description, reference being had to the accompanying drawings, making part of this specification.

My invention relates to that class of feeder attachments adapted to be folded up on the thrashing machine or grain separator for transportation, and it consists in the means employed for tilting the feeder to give access to the thrashing cylinder; for effecting the folding or elevation of the feeder to its position for transportation and for lowering the same to operative position, and in certain details of construction and arrangement of parts, all as hereinafter described and claimed.

In the usual attachment of these feeders to the thrasher or separator, the delivery end of the feeder is, ordinarily, connected with the forward end of the thrasher or machine frame and its forward or receiving end has ordinarily been upheld from the ground on pivoted and folding or removable legs or supports, and, for the transfer of this feeder from its operative position to the top of the thrasher, for transportation, it has been usual to first detach it from the machine frame and then after removing its leg supports in this construction, it has required the strength of three or four men on the ground to lift it up to two or more men on the top of the machine, the latter placing and securing the feeder for transportation. In these machines, too, the rotary grain regulator or straw spreader has, ordinarily, been journaled in the forward end of the thrashing machine or separator and the feeder had to be lifted up over such regulator, rendering it still more difficult to load the feeder for transportation and tending to make the load top-heavy, when so loaded.

The object of my improvement is to remedy these difficulties, support the feeder entirely by its connections with the machine to which it is applied and to facilitate the labor of loading or folding the feeder on the machine and returning the same to operative position after it has been so loaded and carried to the desired position for use.

In the accompanying drawings:—Figure 1 is a side elevation showing my improvements and enough of a thrashing machine or grain separator to show the connection of the feeder therewith, in operative position. Fig. 2 is a similar elevation, showing the feeder folded up on the thrasher for transportation, and Fig. 3 is an end view with the feeder in the position shown in Fig. 2.

A indicates the thrashing machine or grain separator, which may be of any usual or preferred construction and need not therefore be described.

B indicates the feeder attachment, which may also, in its general construction and arrangement, be similar to those in common use, employing an endless apron carrier or other devices for feeding the material to be operated upon to the thrasher.

The carrier or feeder frame is provided at its ends with shafts $a$ and $a'$, journaled in the side bars of the feeder frame or in suitable bracket plates $b$ and $b'$, thereon, as indicated, said shafts carrying the rollers on which the usual endless carrier apron is mounted. The shaft $a$ at the delivery end of the feeder, is extended beyond the sides of the feeder, to engage and support said end of the feeder in bifurcated U-shaped bearing brackets $c$, attached to the forward end of the machine frame. The bearing sockets in these brackets are elongated for a purpose which will appear and are open at their upper ends to facilitate the removal and return of the ends of shaft $a$. The ends of the shaft $a$ are extended beyond the bearing brackets, at one end, to receive a gear wheel $d$, which engages and is driven by a pinion $d'$, fast on the sleeve or hub of a band pulley D, journaled on a stud shaft secured to the side frame bar or plate $b$ of the feeder frame. A band extending from a pulley at A', on the thrashing cylinder shaft or other suitable machine shaft, serves to impart motion to the pulley D and thence to the shaft $a$ for actuating the feed apron, in a manner that will be readily understood. The band operating the pulley D, in practice, is extended to pass around a pulley D', on one end of the shaft of the feed roll and band cutter cylinder $D^2$, said shaft being also journaled in suitable bearings on the feeder frame, as shown.

At a suitable distance below the bearing brackets $c$, the machine frame has other brackets $e$, secured to it, one at each side, in which the lower ends of the curved arms or feeder supports E, E, are pivoted, the upper forward ends of these arms being bifurcated to stride, each, a longitudinal bar $f$, suspended from the side of the feeder frame by upright arms $f'$, as shown, the bar $f$ forming a way or rail sliding in the ends of the arms E in adjusting the position of the feeder. The bifurcated ends of the arms E are held in engagement with the way or rail $f$, by pins, passing through said ends above and below said rail, said pins permitting the sliding of the rail and the rocking of the ends of the arms E, relative thereto. The arms or supports E, E, are connected by suitable cross braces E', which serve to unite them and to form a pivoted frame support, engaging the feeder frame near the center of its length, as shown In suitable bearings on the arms E, E, two transverse shafts $g$ and $h$ are mounted, carrying windlass drums or cylinders G and H and provided at one end with ratchet disks $g'$ and $h'$; and outside thereof with cranks G' and H' for operating the shafts and drums. $i$, $i'$, are pawls engaging the ratchet disks for holding them and the drums at any desired adjustment. From the lower or rear windlass G, cords or chains $g^2$, $g^2$, extend to pendent arms $b^2$ on the brackets $b'$, or outer end of the feeder frame and for tilting the feeder upon the arms E, into the position shown in dotted lines in Fig. 1, for giving access to the thrashing cylinder and concave, or preparatory to hoisting the feeder into the position shown in Fig. 2, it is only necessary to operate the windlass G, by means of its crank, winding the cords $g^2$ thereon, until the feeder is tilted as desired.

From the windlass H, cords or chains $h^2$, $h^2$, extend around pulleys $j$, journaled in blocks $j'$, pivotally connected with the machine frame, thence around pulleys $k$, similarly pivoted to the arms E, near their upper ends and thence back to points on the feeder frame in rear of said arms, where they are secured to the feeder frame.

The operation in folding or lifting the feeder up on the machine for transportation, is as follows:—The windlass G is first operated, as explained, to tilt the feeder and bring it to an angle of forty-five degrees, more or less, as indicated by dotted lines in Fig. 1, and the windlass is then locked by means of its ratchet disk and pawl. The windlass H is next operated to wind up its cords and the latter operate to draw the ends of the supporting arms E up to the machine frame, said arms swinging upward and rearward, carrying the delivery end of the feeder over the machine frame until said end rests on a friction roll or cylinder L, journaled in suitable upright brackets $l$, on said frame. The movement of the windlass H is then reversed, giving slack to the cords $h^2$, after which the windlass G is further operated, causing the cords $g^2$ to draw the feeder back on the machine frame and relatively to the arms E, the elongated bearing way $f$, permitting this latter movement. Suitable stops $e'$, on the arms E, limit the backward movement of said arms by striking against the brackets $c$ on the machine frame. The feeder is lowered by first slacking the cords $g^2$ and permitting the feeder to be drawn forward by the cords $h^2$. The latter are then slackened, permitting the pivoted supports to swing outward and forward, until the parts again assume the position shown in dotted lines in Fig. 1, when, by slacking the cords $g^2$, the rear end of the feeder will fall into position to cause its end shaft or pivots to engage the open brackets or stirrups $c$, when the feeder will be in operative position.

The bearing sockets in the brackets or stirrups $c$ are made sufficiently deep to prevent accidental tilting of the feeder by reason of pressure or weight on its forward, receiving end and serve to firmly hold the delivery end of the feeder, except as against the action of the tilting devices. The cords $h^2$, under the arrangement described, prevent rearward thrust of the feeder and the cords $g^2$, prevent forward movement thereof, but when the cords $g^2$, are operated to tilt the feeder, they draw also on the supports E and so give a direct uplift to the delivery end of the feeder until the latter is freed from its retaining stirrups, when the tilting and loading of the feeder can be accomplished as described.

By the devices described, a single attendant, standing on the ground, can readily tilt the feeder for giving access to the cylinder, as explained, and he can also readily load the feeder for transportation, or unload and place the same in position for use, thereby greatly facilitating and reducing the expense of handling. Further, the usual outer legs or ground supports and the supplemental labor of removing and loading such supports, is avoided.

The revolving spreader or feed regulator M, instead of being journaled in the forward end of the machine frame, as usual, is journaled in suitable bearings in the rear end of the feeder frame and is geared to and driven from the shaft $a$, in any suitable manner. By this arrangement the regulator is made a part of and moves with the feeder in loading and unloading the latter and the necessity of lifting the feeder over the regulator, is thereby avoided.

In practice, a pin is inserted through the upper end of the support E and rail $f$, to hold the feeder rigidly in place, when at work.

Parts of the feeder not specifically described may be constructed and arranged in any usual or preferred manner.

Having now described my invention, what I claim as new, and desire to secure by Letters Patent, is—

1. The combination with the machine frame, of the feeder attachment detachably connected, at its discharge end, with said frame, the support for the outer end of and to which said feeder is pivotally connected, pivoted to and carried by said frame, a windlass connected to said feeder for tilting it on said support and a second windlass carried on the machine frame and connected to the feeder for moving it endwise, relative to the frame, substantially as described.

2. The combination with a feeder attachment, detachably connected, at its discharge end, with the machine frame, of the support for its outer end, pivoted to and carried by said frame, said feeder being pivoted to and longitudinally movable on said support, a windlass journaled on said support, for tilting the feeder thereon and a windlass for moving the feeder longitudinally, also journaled on said support, to move with it, and be carried by the machine frame, substantially as described.

3. The combination with the machine frame, of the feeder detachably connected at its delivery end to said frame, the pivoted frame or support connecting said machine frame and feeder and supporting the forward end of the latter, and the two windlasses mounted on said support and connected to the feeder and machine frame, substantially as and for the purpose specified.

4. The combination with the machine frame, of the feeder attachment and the rotating regulator journaled thereon, the pivotal support for the outer end of the feeder connected to said frame and the two windlasses journaled on said support and flexibly connected with the machine frame and feeder, substantially as and for the purpose described.

In testimony whereof I have hereunto set my hand this 18th day of December, A. D. 1893.

VICTOR TOM PAYNE.

Witnesses:
CHESTER P. ALDRICH,
ALBERT C. KINGMAN.